(12) United States Patent
Tremblay et al.

(10) Patent No.: US 11,598,265 B2
(45) Date of Patent: Mar. 7, 2023

(54) TANGENTIAL ON-BOARD INJECTOR

(71) Applicant: PRATT & WHITNEY CANADA CORP., Longueuil (CA)

(72) Inventors: Christophe Tremblay, Boucherville (CA); Franco Di Paola, Montréal (CA); Olivier Nadeau, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/166,184

(22) Filed: Feb. 3, 2021

(65) Prior Publication Data
US 2022/0243657 A1 Aug. 4, 2022

(51) Int. Cl.
*F02C 7/18* (2006.01)

(52) U.S. Cl.
CPC ............ *F02C 7/18* (2013.01); *F05D 2220/32* (2013.01); *F05D 2260/201* (2013.01)

(58) Field of Classification Search
CPC ... F02C 7/18; F05D 2220/32; F05D 2260/201
See application file for complete search history.

(56) References Cited

U.S. PATENT DOCUMENTS

| | | | | |
|---|---|---|---|---|
| 4,292,008 A * | 9/1981 | Grosjean | .................... | F02C 7/18 415/115 |
| 6,227,801 B1 * | 5/2001 | Liu | .......................... | F01D 5/082 29/889.22 |
| 7,670,103 B2 * | 3/2010 | Turner | ....................... | F01D 5/18 415/115 |
| 8,277,169 B2 * | 10/2012 | Riahi | ....................... | F01D 5/081 415/176 |
| 8,381,533 B2 * | 2/2013 | Smoke | ....................... | F02C 7/18 415/115 |
| 9,945,248 B2 * | 4/2018 | McCaffrey | ................ | F02C 7/18 |
| 10,233,842 B2 * | 3/2019 | Clum | ....................... | F01D 25/12 |
| 10,975,770 B1 * | 4/2021 | Simpson | .................... | F02C 7/18 |
| 2005/0150632 A1 * | 7/2005 | Mayer | ...................... | F01D 25/12 165/47 |
| 2005/0201859 A1 * | 9/2005 | Coulon | ................... | F01D 11/02 415/170.1 |

(Continued)

FOREIGN PATENT DOCUMENTS

| | | |
|---|---|---|
| EP | 3260657 | 12/2017 |
| WO | 2014051690 | 4/2014 |
| WO | 2015026591 | 2/2015 |

*Primary Examiner* — Igor Kershteyn
*Assistant Examiner* — Theodore C Ribadeneyra
(74) *Attorney, Agent, or Firm* — Norton Rose Fulbright Canada LLP

(57) ABSTRACT

The gas turbine engine includes a casing assembly located proximate a turbine section of the gas turbine engine, and a tangential on-board injector (TOBI) having a body defining a plurality of air passages extending in a radial direction, the plurality of air passages circumferentially distributed and directing cooling air toward a turbine rotor of the turbine section of the gas turbine engine. An interference fit is provided between a face of the body and a face of a member of the casing assembly, the interference fit defining a fastener-free engagement between the bearing housing and the TOBI to prevent relative movement between the member of the casing and the TOBI.

19 Claims, 4 Drawing Sheets

(56) References Cited

U.S. PATENT DOCUMENTS

| | | | |
|---|---|---|---|
| 2009/0110561 A1* | 4/2009 | Ramerth | F01D 5/082 29/889.21 |
| 2010/0005869 A1* | 1/2010 | Traverso | F01D 5/085 73/112.01 |
| 2010/0154433 A1* | 6/2010 | Ottaviano | F02C 7/18 60/785 |
| 2010/0275612 A1* | 11/2010 | Smoke | F01D 5/081 60/785 |
| 2012/0087784 A1* | 4/2012 | Widener | F02C 6/08 415/180 |
| 2012/0321453 A1* | 12/2012 | Alvanos | F01D 5/081 29/889.3 |
| 2014/0144155 A1* | 5/2014 | Down | F01D 11/08 60/782 |
| 2015/0068214 A1 | 3/2015 | Stevens et al. | |
| 2015/0241067 A1* | 8/2015 | Jause | F02C 3/04 29/890.01 |
| 2015/0275690 A1* | 10/2015 | McCaffrey | F01D 5/087 416/1 |
| 2016/0153291 A1* | 6/2016 | Snyder | F01D 5/082 415/177 |
| 2016/0186606 A1* | 6/2016 | Blaney | F01D 25/12 415/116 |
| 2017/0082027 A1* | 3/2017 | Zelesky | F02C 7/18 |
| 2017/0096945 A1* | 4/2017 | Mueller | F02K 3/04 |
| 2017/0198636 A1* | 7/2017 | Clum | F01D 25/12 |
| 2017/0370226 A1* | 12/2017 | Hummel | F01D 11/00 |
| 2018/0209284 A1* | 7/2018 | Day | F02C 9/18 |
| 2018/0340446 A1* | 11/2018 | Stuart | F02C 3/067 |
| 2018/0355887 A1* | 12/2018 | Wood | F01D 25/14 |
| 2020/0141241 A1 | 5/2020 | Sidorovich Paradiso | |
| 2020/0173365 A1* | 6/2020 | Roberge | B33Y 80/00 |
| 2020/0240279 A1* | 7/2020 | Wedig | F01D 25/12 |
| 2020/0300163 A1* | 9/2020 | Osgood | F01D 25/32 |
| 2021/0115853 A1* | 4/2021 | Naccache | F02C 7/18 |
| 2021/0199051 A1* | 7/2021 | Gonyou | F01D 17/143 |

\* cited by examiner

TANGENTIAL ON-BOARD INJECTOR

TECHNICAL FIELD

The application relates generally to gas turbine engine component cooling and, more particularly, to a tangential on-board injector (TOBI) assembly.

BACKGROUND

Blades, vanes, and other components of gas turbine engines which are heated by a hot gas stream, such as turbine components for example, can be cooled by air compressed upstream within the engine and flowed to the turbine components. A tangential on-board injector (TOBI) is used for this purpose, where an inlet of the TOBI receives compressed air, typically produced by the compressor, and discharges a stream of cooling air tangentially to the rotating turbine assembly. Improvements of such TOBIs are however sought.

SUMMARY

In one aspect, there is provided a gas turbine engine comprising: a casing assembly extending circumferentially around a central axis of the gas turbine engine, the casing assembly located proximate a turbine section of the gas turbine engine; a tangential on-board injector (TOBI) having a body annularly extending around the central axis, the body defining a plurality of air passages extending in a radial direction relative to the central axis, the plurality of air passages circumferentially distributed about the central axis and directing cooling air toward a turbine rotor of the turbine section of the gas turbine engine; and an interference fit between a face of the body and a face of a member of the casing assembly, the interference fit defining a fastener-free engagement between the member of the casing and the TOBI to prevent relative movement therebetween.

In some embodiments, a reaction force between the TOBI and the member of the casing at the interference fit is in a radial direction relative to the central axis.

In some embodiments, the interference fit includes a second interference fit between a second face of the body and the member of the casing assembly, inlets of the plurality of air passages disposed axially between the interference fit and the second interference fit.

In some embodiments, reaction forces between the TOBI and the member of the casing at the interference fits are in a radial direction relative to the central axis.

In some embodiments, the body includes a central section defining the plurality of air passages and a first lateral section, the first lateral section being a protrusion extending axially from the central section, the protrusion defining the face of the body, the interference fit defined between the protrusion and the member of the casing assembly.

In some embodiments, the body includes a second lateral section, the interference fit including a second interference fit between the second lateral section and the member of the casing assembly.

In some embodiments, the body of the TOBI defines secondary air passages for directing the cooling air toward an annular gaspath of the gas turbine engine.

In some embodiments, the body of the TOBI includes a central section defining the plurality of air passages and tabs secured to the central section, the tabs extending circumferentially around the central axis and protruding radially away from the central axis, the secondary air passages defined circumferentially between the tabs.

In some embodiments, an alignment protrusion extends from one of the tabs, the alignment protrusion received within an aperture defined by the member of the casing assembly when the secondary air passages are fluidly connected to air passages defined by the member of the casing assembly.

In some embodiments, the casing assembly includes a support flange protruding radially inwardly toward the central axis, the tabs disposed axially between the support flange and the member of the casing assembly.

In some embodiments, the body further includes an annular protrusion extending axially from the central section relative to the central axis, the annular protrusion extending circumferentially around the central axis, the annular protrusion defining tertiary air passages.

In some embodiments, the TOBI is made of Inconel 625™.

In some embodiments, the member of the casing assembly is a bearing housing extending circumferentially around the central axis, the bearing housing secured to one or more of casings of the casing assembly, the face of the member of the casing assembly defined by the bearing housing, the interference fit defined between the bearing housing and the body of the TOBI.

In some embodiments, at least one brush seal is secured to the TOBI via a second interference fit between the body of the TOBI and the at least one brush seal.

In another aspect, there is provided a tangential in-board injector (TOBI) assembly for a gas turbine engine, comprising: a bearing housing securable to a casing of the gas turbine engine, the bearing housing extending circumferentially around a central axis; a TOBI having: a central section defining primary air passages circumferentially distributed about the central axis, the air primary air passages extending in a direction having a radial component relative to the central axis, and a lateral section extending from the central section; and an interference fit between the bearing housing and the lateral section of the TOBI, the interference fit defining a fastener-free engagement between the bearing housing and the TOBI.

In some embodiments, the TOBI defines a second lateral section extending from the central section, the central section located between the lateral section and the second lateral section, the second lateral section defining a second face sized to define a second interference fit with the bearing housing.

In some embodiments, the lateral section is a protrusion extending annularly around the central axis, the protrusion defining secondary air passages.

In some embodiments, the protrusion defines cut outs circumferentially distributed around the central axis, the cut outs defining the secondary air passages.

In some embodiments, the second lateral section defines tabs extending circumferentially around the central axis, tertiary air passages defined circumferentially between the tabs.

In some embodiments, an alignment protrusion extends from one of the tabs, the alignment protrusion sized to be received within an aperture defined by the bearing housing when the tertiary air passages are fluidly connected with air passages defined by the bearing housing and with the secondary air passages.

BRIEF DESCRIPTION OF THE DRAWINGS

Reference is now made to the accompanying figures in which.

DETAILED DESCRIPTION

Figure 1:
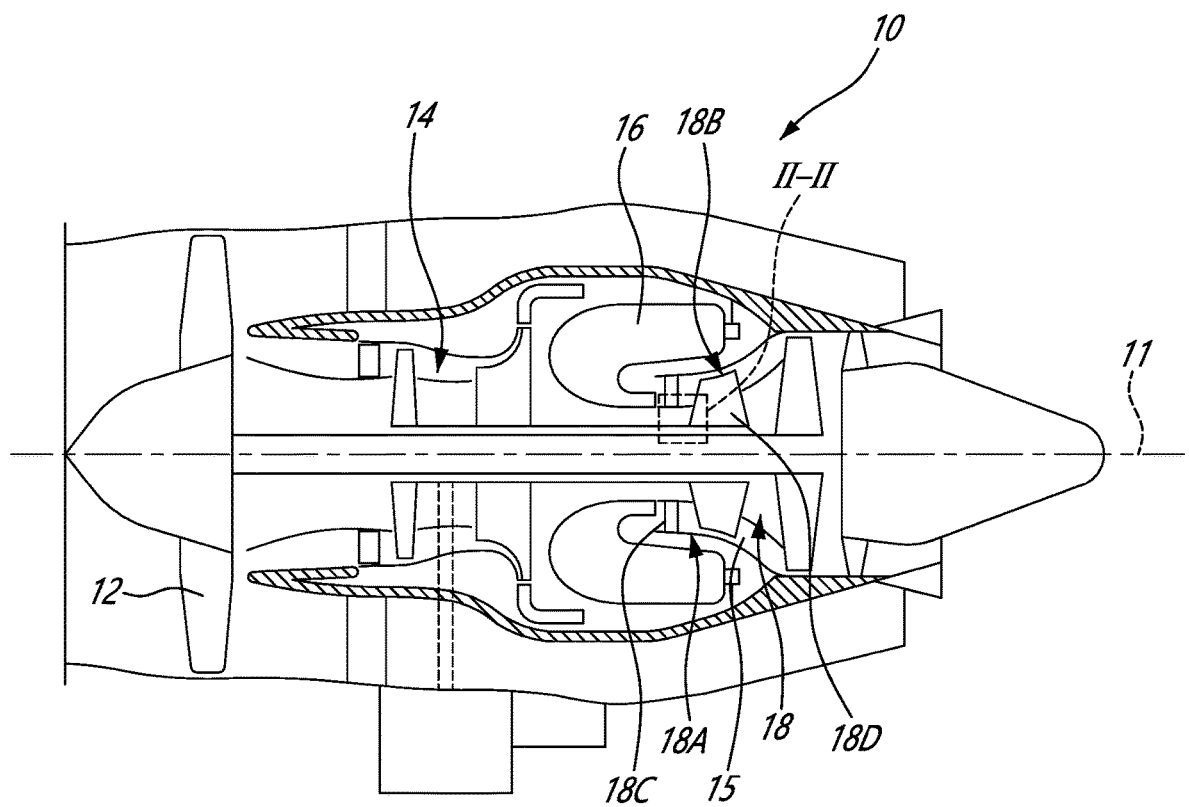
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Components of the gas turbine engine 10 rotate about a longitudinal central axis 11.

The turbine section 18 includes a stator assembly 18A and a rotor assembly 18B. An annular gaspath 15 for the hot combustion gases is provided downstream of the combustor 16, and extends axially between alternating rows of stator vanes 18C of the stator assembly 18A, and rotor blades 18D of the rotor assembly 18B.

Figure 2:
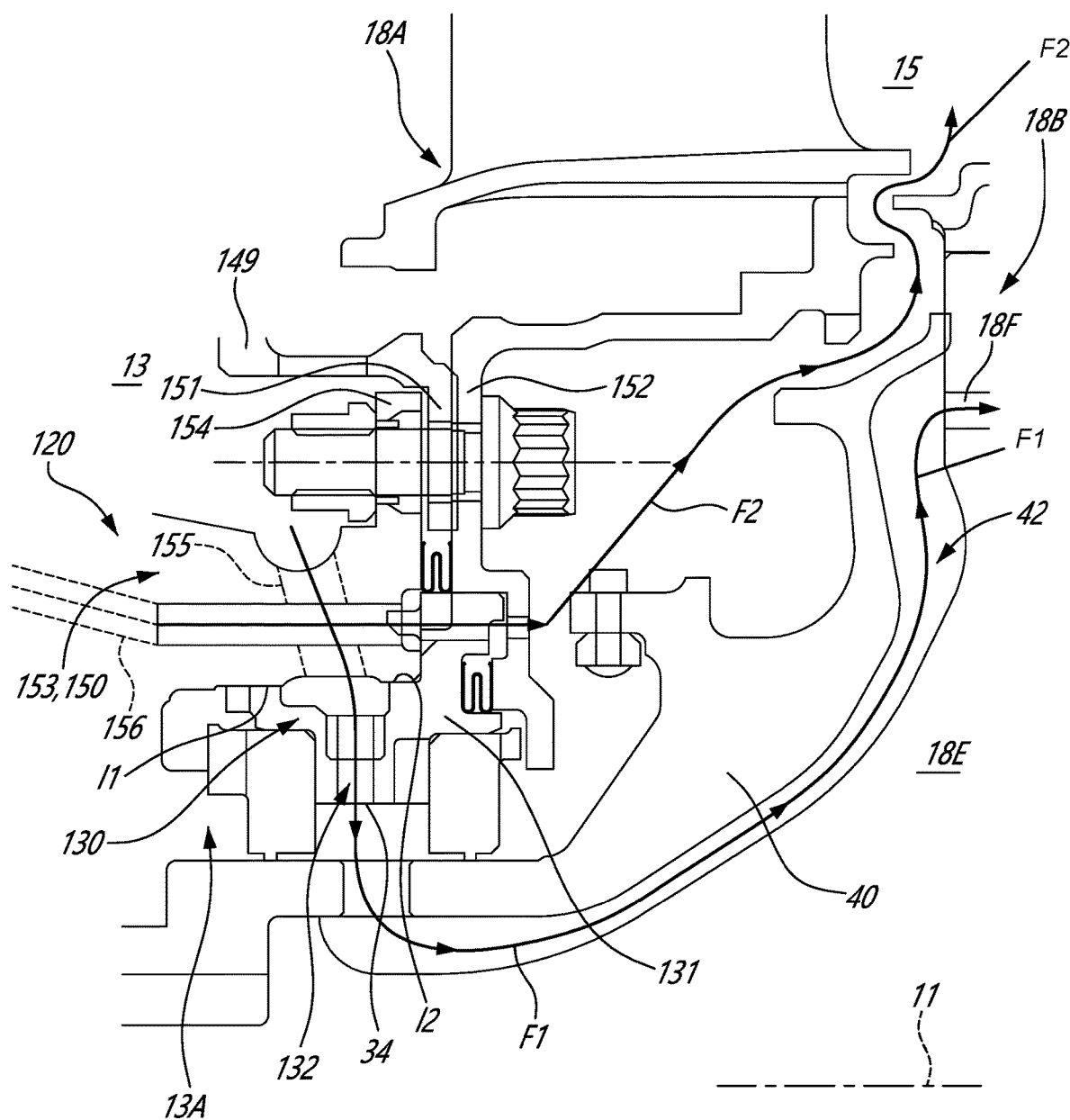
FIG. 2 is a cross-section view of a TOBI assembly in accordance with another embodiment that may be used with the engine of FIG. 1.
Figure 3:
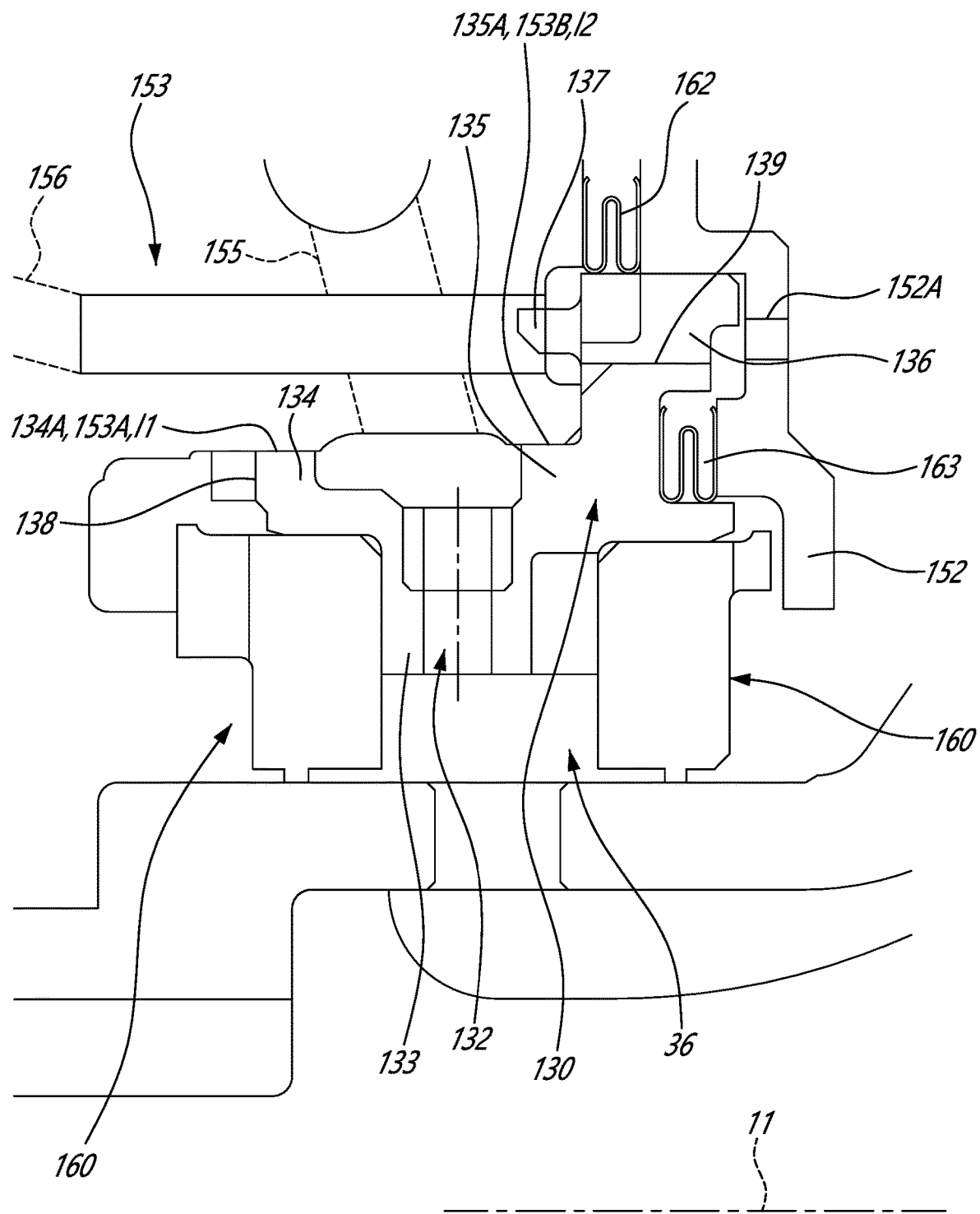
FIG. 3 is an enlarged view of a portion of FIG. 2.

Referring to FIGS. 2-3, an annular cavity 13 is formed within the stator assembly 18A and it functions in part as a reservoir for receiving cooling air from its source, for example, the discharge of the compressor section 14. The stator assembly 18A may be mounted to, or part of, a casing of the engine 10, and may therefore sometimes be referred to herein as a casing assembly. The cooling air is provided to the rotor assembly 18B to cool the rotor blades 18D, as described in detail below. In FIG. 2, immediately downstream of the row of stator vanes 18C is disposed the row of rotor blades 18D. The rotor blades 18D rotate about the central axis 11, and extend radially outwardly from a supporting rotor disk 18E via respective rotor blade roots 18F, which are mounted in the supporting rotor disk 18E. The supporting rotor disk 18E includes a plurality of inlets, each communicating with internal passages of the rotor blade root 18F and the rotor blade 18D, through which the cooling air is flows during operation of the engine to cool the rotor blade 18D.

A Tangential On-Board Injection (TOBI) assembly may be used to direct cooling air toward a rotor of the turbine section 18. One such TOBI assembly is described in U.S. Patent Application Publication No. US 2020/0141241, the entire contents of which are incorporated herein by reference. Typical TOBI assemblies are bolted to a casing of the gas turbine engine 10 using mating flanges and bolts. Since a part of the TOBI includes a flange that extends toward the gas path, it is subjected to high temperatures that may cause thermal stress. Moreover, such flange of the TOBI is mechanically coupled to a flange of a stator assembly of the turbine section. Hence, mechanical forces imparted on the stator assembly may be transmitted to the TOBI. Moreover, in some cases, such a bolted connection may prevent leaving sufficient space to receive the TOBI.

Referring to FIGS. 2-3, a TOBI that may at least partially alleviate this drawback is shown at 120. The TOBI assembly 120 helps to direct the cooling air in a direction of rotation of the rotor assembly 18B and further into the rotor assembly 18B to cool components thereof, such as the rotor blades 18D. The TOBI assembly 120 includes a TOBI 130 to increase the flow tangential velocity to reduce the losses and heat pickup due to windage, and a cover plate, which may also be referred to as a rotatable back plate or simply back plate. The cover plate is a rotating component, disc plate, disc cover, rotating cover and rotating cover plate, 40 to distribute the cooling air to the rotor assembly 18B, both of which are now described.

In the embodiment shown in FIGS. 2-3, the TOBI 130 is a stationary component. The TOBI 130 does not rotate with the rotor assembly 18B or with the cover plate 40. In the depicted embodiment, the TOBI 130 is made stationary because a body 131 of the TOBI 130 is non-rotating relative to the stator assembly 18A. In a particular embodiment, the expression "static" could be interpreted as a component rotating at a different speed, including counter-rotation.

The TOBI 130 defines circumferentially spaced-apart passages 132. The passages 132 of the TOBI 130 may be oriented in a tangential angle towards the direction of rotation of the rotor assembly 18B, extend radially inwardly toward the axis 11 and terminate at nozzles 34, which are provided to inject the cooling air from the cavity 13 into an annular transfer chamber 136 disposed radially inwardly from the nozzles 34. The transfer chamber 36 is a plenum in which the cooling air collects before it is transferred or provided to the cover plate 40. In operation, the cooling air enters the cavity 13 and is received by the TOBI 130 before being discharged by the nozzles 34 into the transfer chamber 36, and then to the rotating cover plate 40. The nozzles 34 impart a swirl flow vector or swirling movement to the cooling air discharged into the transfer chamber 36, and also impart a radial flow vector being transverse or normal to the axis 11. The transfer chamber 36 is sealed with seals 160, which engage the rotating cover plate 40 to prevent or reduce leakage of cooling air from the transfer chamber 36.

In FIG. 2, the TOBI 130 is shown as a "radial" TOBI because the cooling air enters the TOBI 130 along a radial flow path. In an alternate embodiment, the TOBI 130 is an axial TOBI where the cooling air enters the TOBI 130 along an axial flow path. In some configurations of the gas turbine engine 10, a radial TOBI may be preferred because of its smaller axial length when compared to an axial TOBI.

Still referring to FIG. 2, the cover plate 40 is mounted to the rotor assembly 18B to rotate with the rotor assembly 18B about the same axis 11. Rotation of the rotor assembly 18B causes rotation of the cover plate 40. The cover plate 40 is a cover plate or rotor cover that is positioned axially downstream or aft of the TOBI 130. The cover plate 40 has an annular shape in the depicted embodiment.

In the depicted embodiment, the cover plate 40 is mounted upstream of the rotor disk 18E to rotate with it. The cover plate 40 is mounted such that the radially outer periphery of the cover plate 40 is forced by a centrifugal force to abut the rotor blade root 18F as the rotor assembly 18B rotates about the axis 11 so that an annular and radial passage 42 is formed between the rotor disk 18E and the cover plate 40. Other embodiments for mounting the cover plate 40 are possible and within the scope of the present disclosure. In operation, air exits the chamber 36 via apertures defined by the cover plate 40 and flows within the radial passage 42 to cool to reach and cool turbine components.

Referring now to FIG. 3, the TOBI 130 is secured to a member of a casing assembly 150 via at least one interference fit. In the embodiment shown, two interference fits are used to secure the TOBI 130 to the casing assembly 150.

More than two interference fits may be used. That is, the TOBI 130 does not rely on bolted flanges as attachment to the casing assembly 150. Stated differently, the one or more interference fit between the TOBI 130 and the casing assembly 150 defines a fastener-free engagement between the casing assembly 150 and the TOBI 130. The one or more interference fit therefore define a fastener-free engagement between the TOBI 130 and the casing assembly 150 to prevent relative movement therebetween. The TOBI may be secured to the casing assembly 150 solely via one or more interference fits I1, I2 as it will be discussed below.

It will be understood that, in some cases, some other components, such as seals, may be secured between the TOBI 130 and the casing assembly 150 and may offer some degree of retention. However, the one or more interference fit used to secure the TOBI 130 to the casing assembly 150 creates a majority (e.g., more than 50%) of a retention force between the TOBI 130 and the casing assembly 130. The one or more interference fit may create substantially all of the retention force via which the TOBI 130 is secured to the casing assembly 150.

The TOBI 130 may therefore be free of bolted connection to the casing assembly 150. An interference fit is also known as a press fit or a friction fit and is present when a tight fit is present between mating parts. An interference fit may be provided by having a first component having a radially inner surface of a diameter smaller than that of a radially outer surface of a second component. The interference fit is provided between the radially inner and outer surfaces when the first component is assembled to the second component. In some cases, an interference fit is also referred to as a spigot fit. To create such an interference fit between two components, a temperature change may be imparted to one or more of the two components to induce thermal change of dimension enough to engage the two components together. The interference fit is created when the two components revert to their original temperature. In some cases, the interference fit may be present when the engine 10 is not in operation or may arise when the engine 10 is running as a result of thermal growth. The interference fit may be created by forcefully engaging two components together.

In the embodiment shown, a combustor outer liner 149 of the combustor of the engine 10 and the stator assembly 18a are secured to the casing assembly 150 via two flanges, namely an upstream flange 151 for the outer liner 149 and a downstream flange 152 for the stator assembly 18a. These two flanges 151, 152 are directly secured to one another. In the embodiment shown, fasteners, such as bolts, extend through registering and circumferentially distributed apertures defined through the two flanges 151, 152. The downstream flange 152 may also be referred to as an inner rear support. The casing assembly 150 includes a bearing housing 153. The outer liner 149 and the stator assembly 18a are herein secured to the casing assembly 150 via the bearing housing 153 and via the first and second flanges 151, 152. Namely, the bearing housing 153 includes a flange 154 that defines apertures configured to register with the apertures defined through the upstream and downstream flanges 151, 152. Fasteners, such as bolts, extend through the apertures defines through the three flanges to secure them to one another.

The TOBI 130 includes a body 131 that extends circumferentially all around the central axis 11. In an alternate embodiment, the body 131 may include a plurality of circumferential sections distributed around the central axis 11. In the illustrated embodiment, the body 131 of the TOBI 130 extends annularly all around the central axis 11. The body 131 of the TOBI 130 is secured to the bearing housing 153 via the two interference fits I1, I2. It will be appreciated that the TOBI 130 may be secured to another member of the casing assembly 150. For instance, the interference fits may be defined between the TOBI 130 and a casing of the casing assembly 150. Such a casing may be, for instance, a gas generator case.

The body 131 defines primary air passages 132 for flowing cooling air from, for instance, the compressor section 14 toward components of the turbine section 18 in need of cooling. In the embodiment shown, the primary air passages 132 are defined axially between the two interference fits I1, I2. The two interference fits I1, I2 may therefore act as seals to limit air diverting away from the primary air passages 132. The primary air passages 132 extend from inlets to outlets. The inlets are located radially outwardly from the outlets relative to the central axis 11. The inlets may be circumferentially offset from the outlets to induce a tangential component in the flow exiting the primary air passages 132. An axial offset between the inlets and the outlets is possible.

Referring to more particularly to FIG. 3, the TOBI 130 includes a central section 133, a first lateral section 134, and a second lateral section 135. The primary air passages 132 are defined by the central section 133, which is located between the first and second lateral sections 134, 135. The inlets of the primary air passages 132 are in the present embodiment located between the first and second lateral sections 134, 135. The first lateral section 134 is in the shape of an annular protrusion extending axially from the central section 133 relative to the central axis 11. The annular protrusion extends annularly around the central axis 11. The first lateral section 134 defines a first face 134A that faces away from the central axis 11. In the present case, the first face 134A of the first lateral section 134 is normal to a radial direction relative to the central axis 11. The second lateral section 135 defines a second face 135A that faces away from the central axis 11. In the present case, the second face 135A of the second lateral section 135 is normal to the radial direction. Therefore, reaction forces between the TOBI 130 and the bearing housing 153 at the one or more interference fits I1, I2 are in a radial direction relative to the central axis 11. The radial reaction forces create axial and circumferential retention forces between the TOBI 130 and the bearing housing 153. The retention forces may also include friction forces. However, in an alternate embodiment, the reaction forces may be exerted in an axial and/or a circumferential direction relative to the central axis 11. For instance, a TOBI may be received between two axially spaced-apart members and axial interference fits between the TOBI and those two members may prevent relative motion therebetween.

In the embodiment shown, the first interference fit I1 is defined between a first face 153A of the bearing housing 153 and the first face 134A of the first lateral section 134 of the TOBI 130. The second interference fit I2 is defined between a second face 153B of the bearing housing 153 and the second face 135A of the second lateral section 135 of the TOBI 130. It will be understood that, in an alternate embodiment, only one interference fit may be used to secure the TOBI 130 to the bearing housing 153. Dimensions of surfaces defining the interference fit may be selected to ensure proper retention of the TOBI 130 to the casing assembly 150. In the present embodiment, the interference fits I1, I2 are defined between radially-outwardly facing faces of the TOBI 130 and between radially-inwardly facing face of the bearing housing 153. Alternatively, the interference fits may be defined at radially-inwardly facing faces of the TOBI 130.

Figure 4:
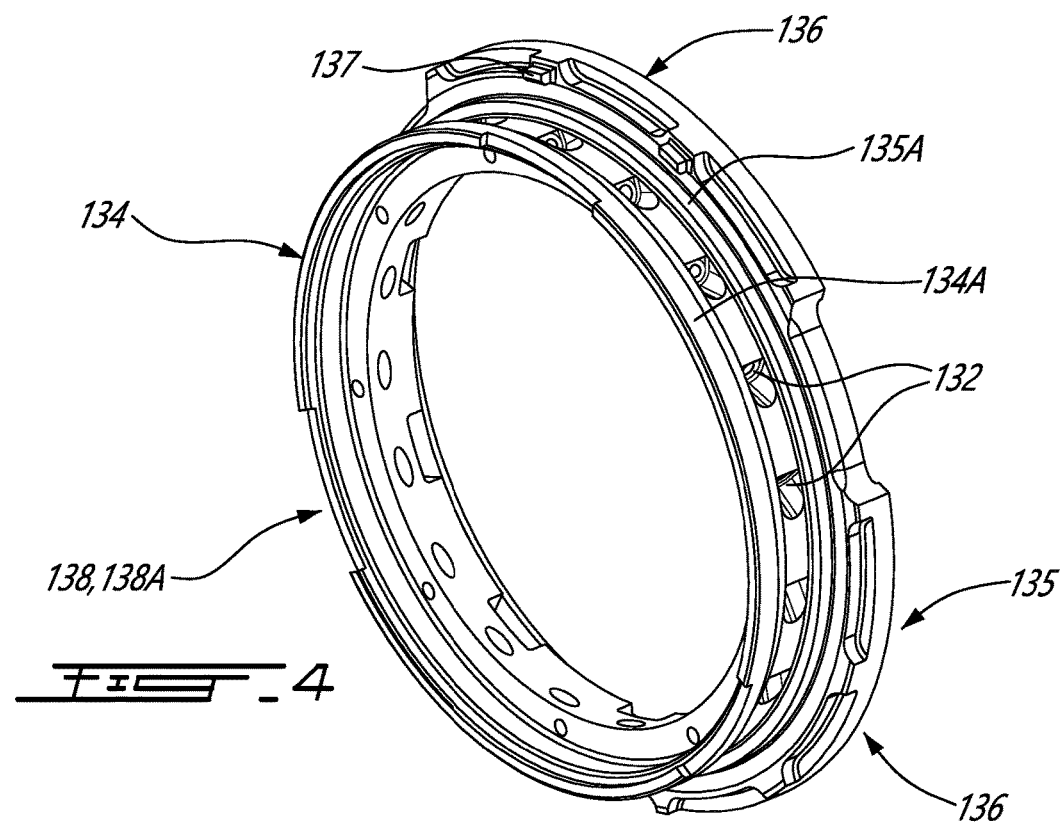
FIG. 4 is a front three dimensional view of the TOBI of FIG. 2.
Figure 5:
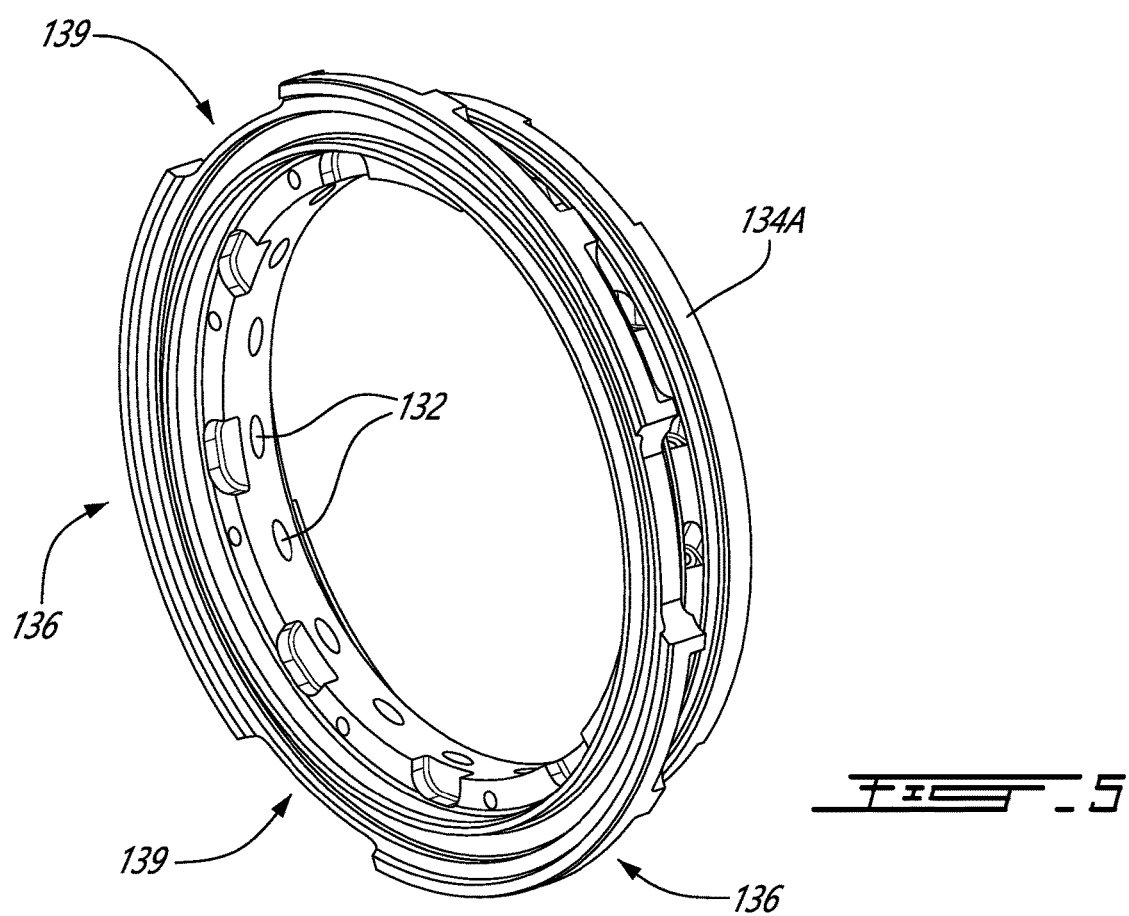
FIG. 5 is a rear three-dimensional view of the TOBI of FIG. 2.

Referring to FIGS. 3-5, the second lateral section 135 of the TOBI 130 includes tabs 136 that are circumferentially distributed about the central axis 11. In the embodiment shown, three tabs 136 are provided, but more or less tabs may be used. The tabs 136 extend radially away from the central section 133. In the present embodiment, the tabs 136 extend radially outwardly from the central section 133 and away from the central axis 11. The tabs 136 are located axially between the inner rear support 152 of the casing assembly 150 and the bearing housing 153. One of the tabs 136 defines an alignment protrusion 137 that is sized to engage an aperture in the bearing housing 153 as explained below. Having the tabs 136 axially between the bearing housing 153 and the inner rear support 152 may assist in axially locating the TOBI 130 relative to the casing assembly 150.

Referring back to FIG. 2, the TOBI 130 is used to distribute compressed air extracted from the compressor section 14 (FIG. 1) at two different compression stages of the compressor section 14. In the embodiment shown, two different air flows of cooling air F1, F2 are used. The first flow F1 is at a higher pressure than the second flow F2. The first flow F1 may include air at a first pressure whereas the second flow F2 may include air at a second pressure less than the first pressure. The first and second flows F1, F2 may be extracted at different bleed ports of the compressor section 14. The first flow F1 flows from the cavity 13 and is injected into the radial passage 42 formed between the rotor disk 18E and the cover plate 40. The second flow F2 is injected toward the annular gaspath 15 and may be used to limit combustion gases form being ingested via gaps between stator and rotor rims.

In the embodiment shown, the bearing housing 153 defines primary air passages 155 and secondary air passages 156. Each of the primary air passages 155 is disposed circumferentially between two adjacent ones of the secondary air passages 156. In other words, the primary air passages 155 are circumferentially interspaced by the secondary air passages 156 such that air flowing in the primary air passages 155 is not mixed with air flowing in the secondary air passages 156. The primary air passages 155 of the bearing housing 153 provide fluid communication between the cavity 13 that receives compressed air from the compressor section 14 and the primary passages 132 of the TOBI 130. Air of the first flow F1 flows along a first flow path from the cavity 13 through the primary air passages 155 of the bearing housing 153 and through the primary air passages 132 of the TOBI 130 to reach the annular and radial passage 42 formed between the rotor disk 18E and the cover plate 40.

Referring to FIGS. 3-5, the TOBI 130 further defines secondary air passages 139 that communicates with the secondary air passages 156 of the bearing housing 153. The secondary air passages 139 are defined by spaces between two circumferentially adjacent tabs 136 of the second lateral section 135 of the TOBI 130. Three of those spaces are present, but more or less spaces, depending on the number of tabs 136, may be used. The alignment protrusion 137 is received within the aperture of the bearing housing 153 when the secondary air passages 139 of the TOBI 130 are in register for fluid communication with the secondary air passages 156 of the bearing housing 153.

Referring to FIGS. 2-5, the air of the second flow F2 flows from within the secondary air passages 156 of the bearing housing 153 into the secondary air passages 139 of the TOBI 130 and then flows through apertures 152A defined through the inner rear support 152 before flowing toward the annular gaspath 15 to limit ingestion of hot gases. In the embodiment shown, the TOBI 130 also includes tertiary air passages 138. These tertiary air passages 138 are defined by cut outs 138A in the first lateral section 134 of the TOBI 130. Three cut-touts 138A are provided in the embodiment shown, but more or less cut outs may be used. The tertiary air passages 138 are circumferentially offset from the secondary air passages 139 so that they do not communicate with one another. The tertiary air passages 138 of the TOBI 130 may flow air received from tertiary air passages defined by the bearing housing 153. This air may be flown into a cavity 13A adjacent a seal of the bearing housing 153 for pressurizing a bearing cavity thereof.

Referring to FIG. 3, in the embodiment shown, two seals 160 are secured to the TOBI 130 and are axially spaced apart from one another relative to the central axis 11. Each of those two seals 160 are brush seals, but any other suitable kind of seals may be used. The two seals 160 are annularly extending around the central axis 11 and are disposed on opposite sides of annular transfer chamber 36. The two seals 160 are used to limit the compressed air injected into the annular transfer chamber 36 from leaking out therefrom and to direct the compressed air toward the radial passage 42 for cooling the rotor disk and blades.

In the embodiment shown, each of the two seals 160 is secured to a respective one of the first lateral section 134 and the second lateral section 135. In the present embodiment, interference fits are provided between radially-inwardly facing surfaces of the first and second lateral sections 134, 135 of the TOBI 130 and radially-outwardly facing surfaces of the seals 160. In the present case, a front one of the seals 160 is axially aligned with a front interference fit I1 defined between the TOBI 130 and the bearing housing 153. The rear one of the seals 160 is axially offset from the rear interference fit I2. Using interference fits to secure the brush seals 160 to the TOBI 130 may not require a retaining ring. A part count and weight reduction may therefore be achieved.

Still referring to FIG. 3, sealing members, such as W-seals or any other suitable type of seal, are disposed at locations for forcing the compressed air along the first and second flows F1, F2. A first sealing member 162 is provided between the bearing housing 153 and the inner rear support 152. A second sealing member 163 is disposed between the second lateral section 135 of the TOBI 130 and the inner rear support 152. The second sealing member 163 is received within a groove defined by the second lateral section 135 of the TOBI 130. The first and second sealing members 162, 163 are respectively disposed radially outwardly and inwardly of the tertiary air passages 139 of the TOBI 130 and apertures 152A defined by the inner rear support 152 to direct the compressed air toward said apertures 152A.

In the embodiment shown, the TOBI 130 is separated from the inner rear support 152. This may help in facilitating assembly of the TOBI 130. The TOBI 130 and brush seals 160 may be secured to one another first and an assembly of the TOBI 130 and brush seals 160 may be installed in the engine 10.

The TOBI 130 may be machined or otherwise formed from a solid part, and may be composed from a suitable material. In one particular embodiment, the presently disclosed TOBI 130 is made of Inconel 625™ but may also be made of a similarly suitable material selected from the group of Inconel 718™ Incoloy 901™, Haynes 242™, and Inconel 100™. Such a material is preferred over other possible aerospace materials, such as those of the group comprising Inconel 713C™, Waspaloy™, and Mar-M-247™. In one particular embodiment, the TOBI 130 is composed of, and may be entirely made of, Inconel 625™ Inconel 625™ is a nickel-based alloy, or super-alloy, composed of more than 50% weight of nickel. Inconel 625™ may include from 20% to 23%, preferably 21.5% weight of chromium, from 8% to 10%, preferably 9% weight of molybdenum, from 3.15% to 4.15%, preferably 3.65% weight of niobium/tantalum, and a remainder of nickel.

Inconel 625™ may be more machineable than Inconel 713C™. More machineable implies may less manufacturing time and/or fewer tools or manufacturing operations may be required. Inconel 625™ may be less expensive than certain other alloys, such as Inconel 713C™. This may allow costs savings both on material costs and on manufacturing costs. Inconel 713C™ is used in certain prior art TOBI designs, when a bolted flange is present to ensure that the TOBI withstand the mechanical and thermal forces imparted on it. Having the present TOBI 130 free of a bolted flange may mechanically and thermally decouple the TOBI 130 from the stator assembly 18A, which may allow manufacturing the TOBI 130 of a less expensive material (e.g.: Inconel 625™). The TOBI 130 may be a turned part that may then be milled to produce periodical features. Turning all the diametric features during the same machining operation may allow to have a better control between the datum and all the other features. All the cooling air passages are machined holes, which may also help reducing the part cost when comparing with complex airfoil shape that may require more milling operations or even more complex shapes that require a casting.

The disclosed TOBI 130 may facilitate assembly of the turbine vanes and may reduce leakage and may reduce weight because the TOBI 130 does not include a bolted flange. The removal of the bolted flange may limit leakage since air can no longer leak through a bolted connection. The TOBI 130 may be more effective in meeting durability requirements. The increase of the life of the TOBI 130 may be achieved by providing the TOBI 130 separated (e.g., not bolted or otherwise directly secured) from the inner rear support 152. This and having the TOBI 130 secured to the bearing housing 153 or other member of the casing assembly 150 may isolate the TOBI 130 from thermal and mechanical stresses that may impede its lifespan.

The disclosed TOBI 130 is a single piece design with air passages fully contained in this single piece. The primary air passages 132, eighteen in the present embodiment, are machined in the part. The two interference fits I1, I2 holding the TOBI 130 may allow for a better control on air flow and may increase part durability.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A gas turbine engine comprising:
a casing assembly extending circumferentially around a central axis of the gas turbine engine, the casing assembly located proximate a turbine section of the gas turbine engine;
a tangential on-board injector (TOBI) having a body annularly extending around the central axis, the body defining a plurality of air passages extending in a radial direction relative to the central axis, the plurality of air passages circumferentially distributed about the central axis and directing cooling air toward a turbine rotor of the turbine section of the gas turbine engine; and
an interference fit between a face of the body and a face of a member of the casing assembly, the interference fit defining a fastener-free engagement between the member of the casing and the TOBI to prevent relative movement therebetween.

2. The gas turbine engine of claim 1, wherein a reaction force between the TOBI and the member of the casing at the interference fit is in a radial direction relative to the central axis.

3. The gas turbine engine of claim 1, wherein the interference fit includes a second interference fit between a second face of the body and the member of the casing assembly, inlets of the plurality of air passages disposed axially between the interference fit and the second interference fit.

4. The gas turbine engine of claim 3, wherein reaction forces between the TOBI and the member of the casing at the interference fits are in a radial direction relative to the central axis.

5. The gas turbine engine of claim 1, wherein the body includes a central section defining the plurality of air passages and a first lateral section, the first lateral section being a protrusion extending axially from the central section, the protrusion defining the face of the body, the interference fit defined between the protrusion and the member of the casing assembly.

6. The gas turbine engine of claim 5, wherein the body includes a second lateral section, the interference fit including a second interference fit between the second lateral section and the member of the casing assembly.

7. The gas turbine engine of claim 1, wherein the body of the TOBI defines secondary air passages for directing the cooling air toward an annular gaspath of the gas turbine engine.

8. The gas turbine engine of claim 7, wherein the body of the TOBI includes a central section defining the plurality of air passages and tabs secured to the central section, the tabs extending circumferentially around the central axis and protruding radially away from the central axis, the secondary air passages defined circumferentially between the tabs.

9. The gas turbine engine of claim 8, comprising an alignment protrusion extending from one of the tabs, the alignment protrusion received within an aperture defined by the member of the casing assembly when the secondary air passages are fluidly connected to air passages defined by the member of the casing assembly.

10. The gas turbine engine of claim 9, wherein the casing assembly includes a support flange protruding radially inwardly toward the central axis, the tabs disposed axially between the support flange and the member of the casing assembly.

11. The gas turbine engine of claim 10, wherein the body further includes an annular protrusion extending axially from the central section relative to the central axis, the annular protrusion extending circumferentially around the central axis, the annular protrusion defining tertiary air passages.

12. The gas turbine engine of claim 1, wherein the member of the casing assembly is a bearing housing extending circumferentially around the central axis, the bearing housing secured to one or more of casings of the casing assembly, the face of the member of the casing assembly defined by the bearing housing, the interference fit defined between the bearing housing and the body of the TOBI.

13. The gas turbine engine of claim 1, comprising at least one brush seal secured to the TOBI via a second interference fit between the body of the TOBI and the at least one brush seal.

14. A tangential in-board injector (TOBI) assembly for a gas turbine engine, comprising:
   a bearing housing securable to a casing of the gas turbine engine, the bearing housing extending circumferentially around a central axis;
   a TOBI having:
      a central section defining primary air passages circumferentially distributed about the central axis, the air primary air passages extending in a direction having a radial component relative to the central axis, and
      a lateral section extending from the central section; and
   an interference fit between the bearing housing and the lateral section of the TOBI, the interference fit defining a fastener-free engagement between the bearing housing and the TOBI.

15. The TOBI assembly of claim 14, wherein the TOBI defines a second lateral section extending from the central section, the central section located between the lateral section and the second lateral section, the second lateral section defining a second face sized to define a second interference fit with the bearing housing.

16. The TOBI assembly of claim 15, wherein the lateral section is a protrusion extending annularly around the central axis, the protrusion defining secondary air passages.

17. The TOBI assembly of claim 16, wherein the protrusion defines cut outs circumferentially distributed around the central axis, the cut outs defining the secondary air passages.

18. The TOBI assembly of claim 17, wherein the second lateral section defines tabs extending circumferentially around the central axis, tertiary air passages defined circumferentially between the tabs.

19. The TOBI assembly of claim 18, comprising an alignment protrusion extending from one of the tabs, the alignment protrusion sized to be received within an aperture defined by the bearing housing when the tertiary air passages are fluidly connected with air passages defined by the bearing housing and with the secondary air passages.

* * * * *